United States Patent [19]
Collins et al.

[11] Patent Number: 5,236,394
[45] Date of Patent: Aug. 17, 1993

[54] EXTERNAL CONVOLUTED HIGH SPEED CONSTANT VELOCITY JOINT BOOT

[75] Inventors: Theodore H. Collins, Rochester Hills; Frederick J. Uchman, Clarkston, both of Mich.

[73] Assignee: GKN Automotive, Inc., Auburn Hills, Mich.

[21] Appl. No.: 579,556

[22] Filed: Sep. 10, 1990

[51] Int. Cl.$^5$ ............................................... F16D 3/84
[52] U.S. Cl. .............................. 464/175; 277/212 FB
[58] Field of Search ........................ 464/173, 175; 277/212 FB; 403/50

[56] References Cited
U.S. PATENT DOCUMENTS

| | | | |
|---|---|---|---|
| 3,798,927 | 3/1974 | Girguis | 464/175 X |
| 3,830,083 | 8/1974 | Hadick et al. | 464/175 |
| 4,693,484 | 9/1987 | Ukai et al. | 464/173 X |
| 4,735,596 | 4/1988 | Ukai et al. | 464/175 |
| 4,895,550 | 1/1990 | Baker | 464/175 |
| 4,927,678 | 5/1990 | Lallement | 464/175 X |

FOREIGN PATENT DOCUMENTS
2257042 8/1975 France ........................ 464/175

Primary Examiner—Daniel P. Stodola
Assistant Examiner—William G. Battista, Jr.
Attorney, Agent, or Firm—Harness, Dickey & Pierce

[57] ABSTRACT

A boot for a high speed constant velocity universal joint having an articulation accommodating portion attached to the outer joint member of the universal joint and a contiguous linear displacement accommodating portion having its end connected to the inner joint member shaft. The junction between the articulation and linear displacement accommodating portions is reinforced to form a boot stabilizer at a point intermediate its opposite ends which inhibits eccentric spinning of the boot at high rotational speeds. The articulation accommodating portion has a first plurality of annular convolutes, the diameters of which diminish as a function of their displacement from the outer joint member. The linear displacement accommodating portion has a second plurality of annular convolutes having substantially equal diameters.

21 Claims, 1 Drawing Sheet

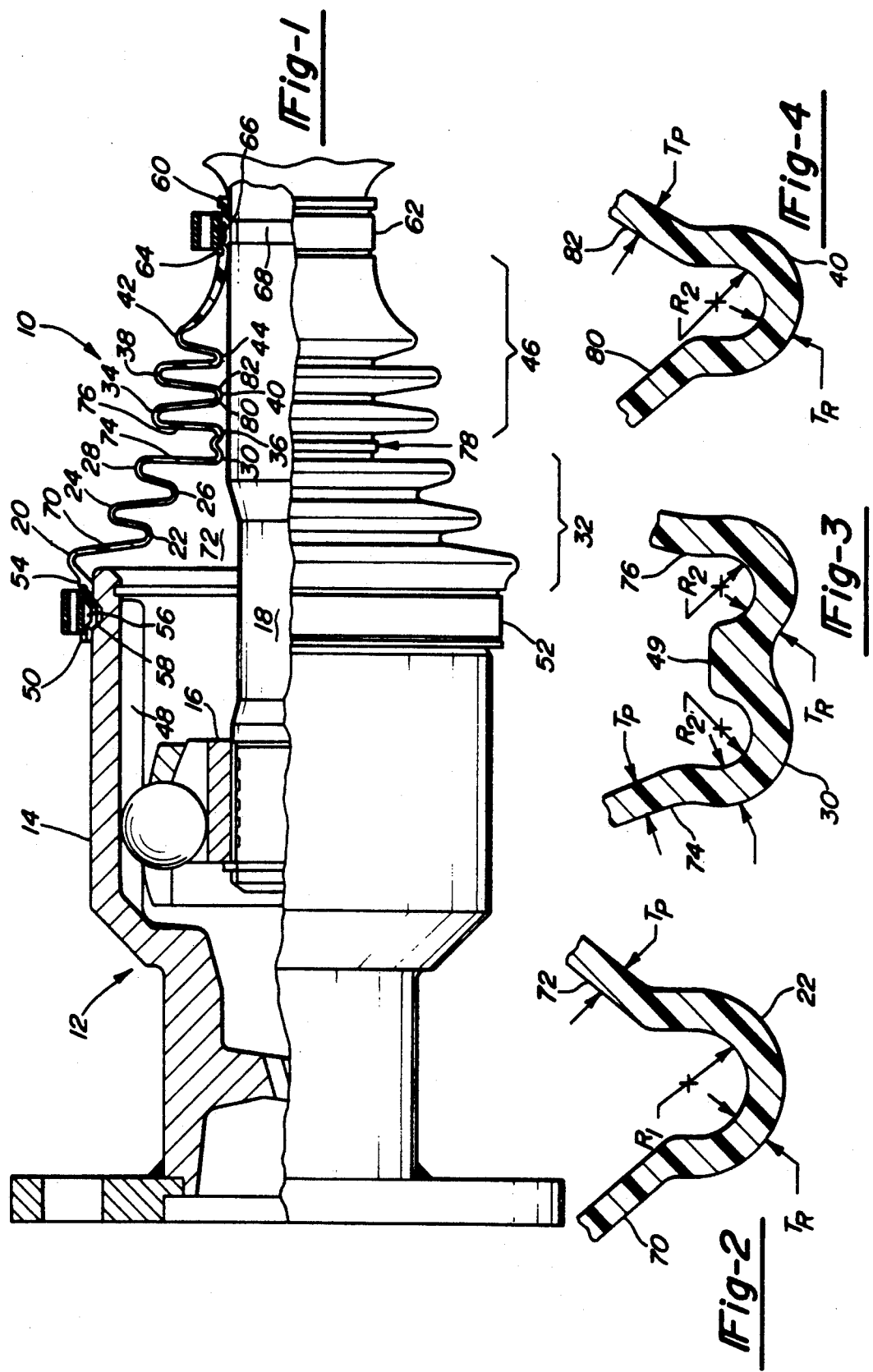

EXTERNAL CONVOLUTED HIGH SPEED CONSTANT VELOCITY JOINT BOOT

BACKGROUND OF THE INVENTION

1. Field of the Invention

The invention is related to the field of flexible boots and in particular to flexible boots for sealing the open ends of constant velocity universal joints which compensate for both angular and linear displacement.

2. Description of the Prior Art

Constant velocity universal joints are currently being used in the drive trains of automotive vehicles. In such vehicles, one universal joint connects a propeller shaft to a rotary output of the vehicle's transmission while a second universal joint connects the propeller shaft to a wheel. As the vehicle travels over an uneven surface or leans to one side or the other during turns, the wheels move up and down in a plane approximately normal to the propeller shaft. Therefore, provisions are made in such universal joints to accommodate for the changes in the distance between the wheel and the transmission as the wheel moves up and down or the engine or transmission vibrates under high loads.

Constant velocity (CV) mechanical joints such as those disclosed by Hazebrook et al in U.S. Pat. No. 4,573,947 or by Kurzeja et al in U.S. Pat. No. 4,605,384 provide for both angular and linear displacement between the inner and outer joint members. Hazebrook et al shows a flexible boot having a linearly extending convolute to compensate for both angular and linear displacement of the inner and outer joint members. In contrast, Kurzeja et al teaches a flexible boot having a plurality of annular convolutes which diminish in diameter as the boot extends outwardly from the constant velocity universal joint. This type of boot is also taught by Ukai et al in U.S. Pat. No. 4,730,834 and 4,805,921, Hadick et al in U.S. Pat. No. 3,830,083, and Mizutani et al in U.S. Pat. No. 4,278,262 as well as various other patents. These patents teach a single set of convolutes of diminishing diameters which compensate for the angular as well as the linear displacement of the inner joint members relative to the outer joint members.

In an alternate configuration, Billet et al in U.S. Pat. No. 4,556,399 teaches a protective boot for a front wheel vehicle having a first section consisting of a plurality of annular convolutions of diminishing diameters and a single annular convolute spaced therefrom.

It has been found that such boots had to have relatively large diameters to prohibit the seal boot from being over stretched when there is a combination of an angular displacement and linear extension or overly compressed when there is an angular displacement and a linear contraction between the two joint members. The present invention is a flexible boot for a constant velocity universal joint which significantly reduces these problems.

SUMMARY OF THE INVENTION

The invention is a resilient boot for a constant velocity universal joint of the type having an outer joint member, an inner joint member articulated to the outer joint member, and a shaft connected to the inner joint member and concentric therewith. The resilient boot has an articulation accommodating portion attachable to the outer joint member which accommodates for the articulation between the outer and inner joint members of the constant velocity universal joint, and a linear displacement accommodating portion attachable to the shaft which accommodates for the linear displacement between the outer and inner joint members. Stabilizer means are provided at the junction between the articulation and linear displacement accommodating portions which maintains the rotation of the boot concentric with the axis of the shaft attached to the inner joint members at high rotational speed of the constant velocity universal joint.

The object of the invention is a boot for a constant velocity universal joint which has two sets of convolutes, one set of which accommodates for the angular displacement between the outer and inner joint members of the constant velocity universal joint and the other set of which accommodates for the linear displacement between the outer and inner joint members.

Another object of the invention is a boot stabilizer disposed intermediate the two sets of convolutes which substantially maintains the rotation of the boot concentric with the shaft of the inner joint member.

Another object of the invention is a boot in which the annular roots of the convolutes have a cross-sectional thickness which is greater than the cross-sectional thickness of the annular peaks of the convolutes and the annular sidewalls of the convolutes which connect the annular peaks with the annular roots.

Another object of the invention is that the junction between the two sets of convolutes is reinforced and strengthened to increase the rigidity of the boot at a location intermediate its ends.

Still another object of the invention is that the diameter of the reinforced junction is slightly larger than the diameter of the inner joint member shaft to inhibit eccentric rotation of the boot at high rotational speeds.

These and other objects of the invention will become more apparent from a reading of the detailed description of the invention in conjunction with the drawings.

BRIEF DESCRIPTION OF THE DRAWINGS

FIG. 1 is a partial cross-sectional side view of the boot attached to a constant velocity universal joint;

FIG. 2 is a partial cross-sectional side view of the annular root of the articulation accommodating portion of the boot;

FIG. 3 is a partial cross-sectional side view of the boot stabilizer portion; and FIG. 4 is a partial cross-sectional side view of the annular root of the linear displacement accommodating portion of the boot.

DETAILED DESCRIPTION OF THE PREFERRED EMBODIMENT

The details of the high speed constant velocity universal joint boot are shown in FIGS. 1 through 4. Referring to FIG. 1, a universal joint boot 10 is shown enclosing the open end of a constant velocity universal joint 12. The constant velocity universal joint 12 has an outer joint member 14, an inner joint member 16, and an inner joint member shaft 18 attached to the inner joint member 16. The inner joint member 16 and inner joint member shaft 18 are angularly and axially displaceable relative to the outer joint member 14.

The boot 10 is preferably made from a co-polymer thermoplastic elastomer such as DuPont Hytrel Grade 8139 or 5612b manufactured by EI. DuPont de Nemours of Wilmington, Del.

The boot 10 has a first plurality of annular convolutes defined by annular peaks 20, 24, and 28 and annular roots 22, 26, and 30. This first plurality of convolutes define an articulation accommodating portion 32 of the boot 10 which accommodates for the angular displacement of the inner joint member 16 and the inner joint member shaft 18 relative to the outer joint member 14. As generally taught by the prior art, the diameters of the annular peaks and the annular roots of the annular convolutes in the articulation accommodating portion 32 of the boot decrease as a function of their distance from the outer joint member 14 of the constant velocity universal joint 12.

A second plurality of annular convolutes are defined by annular peaks 34, 38, and 42 and annular roots 36, 40, and 44. This second plurality of annular convolutes define a linear displacement accommodating portion 46 of the boot which accommodates for the linear displacement of the inner joint member 16 relative to the outer joint member 14 along an internal linear ball race 48.

As shown in FIG. 1, the annular root 30 of the articulation accommodating portion 32 of the boot is joined directly to the annular root 36 of the linear displacement accommodating portion 46 of the boot. The diameter of the annular roots 30 and 36 are substantially equal. The diameter of the annular peaks 34 and 38 are substantially equal. The diameter of the annular peak 42 may be equal to the diameters of annular peaks 34 and 38 but preferably is smaller as shown. The diameters of the annular roots 40 and 44 are selected to be slightly larger than the diameters of the shaft 18 such that there will be minimal contact of the annular roots with the shaft 18. The diameter of the annular roots 30 and 36 are slightly smaller (approximately 1mm) than the diameters of the annular roots 40 and 44 and are selected so that during high speed operation of the constant velocity universal joint, when the inner joint member is angularly displaced relative to the outer joint member, the annular roots 30 and 36 will ride down close to the shaft 18 maintaining the junction between the articulation accommodating portion 32 and the linear displacement accommodating portion 46 substantially concentric with the shaft 18. This prevents eccentric displacement of the boot during high speed operation, prevents excess vibration of the boot, and significantly increases its operational life.

The boot 10 has a large diameter end portion 50 which is clamped to the outer joint member by a band clamp 52 received in an annular clamp groove 54. An annular rib 56 protruding from the inner surface of the large diameter end portion 50 of the boot 10 is received in a locking groove 58 provided in the external surface of the outer joint member 14 near its open end. The boot 10 also has a small diameter end portion 60 which is sealing clamped to the shaft 18 by a clamp band 62. The small diameter end portion 60 has an annular clamp groove 64 in which the band clamp 62 is received. The small diameter end portion 60 also has an annular rib 66 which is received in an annular locking groove 68 provided in the shaft 18 to prevent linear displacement of the small diameter end portion 60 of the boot along the shaft 18.

The details of the annular roots 22 and 26 are shown in FIG. 2. The annular roots 22 and 26 are identical, therefore, only the annular root 22 is discussed in detail. FIG. 2 is a cross-sectional side view of the annular root 22 and is shown with the boot 10 in its relaxed state in which annular sidewall portions 70 and 72 of the convolutes connect the annular root 22 with the adjacent annular peaks 20 and 24, respectively. The annular sidewall portions 70 and 72 are attached to the annular root 22 which has a half circular or semi-circular cross section as shown. The half circular configuration of the annular roots 22 and 26 have a first predetermined radius of curvature $R_1$ and a predetermined wall thickness $T_R$ which preferably is thicker than the wall thickness $T_P$ of the annular sidewall portions 70 and 72. In general, the cross-sectional thickness of the annular roots may be from one to two times the cross-sectional thickness of the annular sidewall portions and preferably is approximately 1.5 times the cross-sectional thickness of the annular sidewall portions 70 and 72. This increased cross-sectional thickness of the annular roots 22 and 26 increases the durability of these annular roots against wear and abrasion when they contact the shaft 18 during maximum angular displacement of the inner joint member 16 and its shaft 18 relative to the outer joint member 14. In the preferred embodiment, the cross-sectional thickness of the annular roots 22 and 26 range from 1.15 to 1.45 mm while the cross-sectional thickness of the annular sidewall portions 70 and 72 may range from 0.6 to 0.9 mm.

FIG. 3 is a cross-sectional side view of the junction of the articulation accommodating portion 32 and the linear displacement accommodating portion 46 of the boot in which the annular roots 30 and 36 are connected to each other. An annular rib 49 is provided to reinforce the junction between annular roots 30 and 36. The annular rib 49 also increases the annular stiffness of this junction and assures that this junction will retain a circular configuration during high speed operation.

The cross section of annular roots 30 and 36 have a generally half or semi-circular configuration having an internal radius of curvature $R_2$. The radius of curvature $R_2$ is less than the radius of curvature $R_1$ of the annular roots 22 and 26 which reduces the flexibility of the annular roots 30 and 36 compared to the annular roots 22 and 26. The annular roots 30 and 36 have a cross-sectional thickness $T_R$ which is substantially the same as the cross-sectional thickness of the annular roots 22 and 26. Preferably, the radius of curvature $R_2$ is 0.7 times the radius of curvature $R_1$ and in the preferred embodiment the radius of curvature $R_1$ is approximately 1.0 mm. The cross-section thickness $T_P$ of the annular sidewall portions 74 and 76 which connect the annular peaks 28 and 34 to the annular roots 30 and 36, respectively, is substantially the same as the cross-sectional thickness $T_P$ of the sidewall portions 70 and 72 of the articulation accommodating portion 32 of the boot.

The annular roots 30 and 36 in conjunction with the annular rib 49 form a boot stabilizer 78 at the junction between the articulation accommodating portion 32 and the linear displacement accommodating portion 46 which prevents the boot from spinning eccentrically at high rotational speeds.

FIG. 4 is a cross section of the annular root 40. Since the annular roots 40 and 44 are identical, only the annular root 40 will be discussed in detail. The annular roots 40 and 44 have a half circular or semi-circular cross-sectional shape having an internal radius of curvature $R_2$. The internal radius of curvature $R_2$ is substantially the same as the internal radius of curvature $R_2$ discussed relative to the annular roots 30 and 36 shown in FIG. 3. The annular roots 40 and 44 also have a cross-sectional thickness $T_R$ which is substantially the same as the cross-sectional thickness $T_R$ of the annular roots 30 and 36. Annular sidewall portions 80 and 82 which connect the annular root 40 to the annular peaks 34 and 38 have a cross-sectional thickness $T_P$ which also is substantially the same as the cross-sectional thickness of the annular sidewall portions 70, 72, 74, and 76 discussed relative to FIGS. 2 and 3.

In operation, the annular convolutes of the articulation accommodating portion 32 of the boot accommodates for the angular displacement of the outer joint member 14 relative to the inner joint member 16 and the shaft 18 in a conventional manner. The annular convolutes of the linear displacement accommodating portion 46 of the boot 10 accommodates for the linear displacement of the inner joint member 16 and the shaft 18 relative to the outer joint member 14 resulting from a transverse displacement of the constant velocity universal joint 12 such as the vertical displacement of a driven wheel in an automotive vehicle. The boot stabilizer 78 maintains the junction between the articulation accommodating portion 32 and the linear displacement accommodating portion 46 concentric with the shaft 18 and prevents the boot from spinning eccentrically relative to the shaft 18 at high rotational speeds of the constant velocity universal joint.

Although a preferred embodiment of the boot for the high speed constant velocity universal joint has been shown in the drawings and described in detail in the specification, it is not intended that the boot be limited to the specific structure shown and described herein. It is recognized that those skilled in the art may make structural changes without departing from the spirit of the invention as set forth in the appended claims.

What is claimed is:

1. A boot for a constant velocity universal joint of the type having an outer joint member, an inner joint member and a shaft connected to said inner joint member and coaxial therewith, said boot comprising:
   an articulation accommodating portion having a first end adapted to connect to said outer joint and an opposite end;
   a linear displacement accommodating portion having a first end joined to said opposite end of said articulation accommodating portion and an opposite end adapted to connect to said shaft;
   stabilizer means including an external rib provided at the junction of said articulation accommodating portion and said linear displacement accommodating portion for maintaining the rotation of said junction concentric with said shaft at high rotational speeds of said constant velocity joint, said stabilizer means having a diameter smaller than the diameter of said linear displacement accommodating portion and slightly larger than said shaft diameter.

2. The boot of claim 1 wherein said articulation accommodating portion comprises:
   a large diameter end portion adapted to connect to said outer joint member; and
   a first plurality of convolutes joined to said large diameter end portion, said first plurality of convolutes consisting of alternating annular peaks and annular roots, the peak diameters of said annular peaks closer to said large diameter end portion being larger than the peak diameters of said annular peaks closer to said opposite end of said articulation accommodating portion and the root diameters of said annular roots closer to said large diameter end portion being larger than the root diameters of said annular roots closer to said opposite end of said articulation accommodating portion.

3. The boot of claim 2 wherein said first plurality of convolutes comprises three annular peaks.

4. The boot of claim 2 wherein said linear displacement accommodating portion comprises:
   a second plurality of convolutes joined to said first plurality of convolutes, said second plurality of convolutes having a plurality of annular peaks and annular roots, said annular peaks having substantially equal peak diameters and said annular roots having substantially equal root diameters; and
   a small diameter end portion connected to said second plurality of convolutes adapted to attach to said shaft.

5. The boot of claim 4 wherein said second plurality of convolutes has two peaks.

6. The boot of claim 4 wherein said shaft has a predetermined diameter in the region underlying the junction of said articulation and said linear displacement accommodating portions, said first plurality of convolutes terminating in an end annular root having a diameter slightly larger than said predetermined diameter, said second plurality of convolutes having a first annular root connected to said end annular root, said first annular root having a diameter substantially equal to said diameter of said end annular root.

7. The boot of claim 4 wherein said annular roots of said second plurality of convolutes have a cross-sectional thickness greater than the cross-sectional thickness of said annular peaks of said second plurality of convolutes.

8. The boot of claim 7 wherein said annular roots of said second plurality of convolutes have a cross-sectional thickness approximately 1.5 times a cross-sectional thickness of said annular peaks of said second plurality of convolutes.

9. The boot of claim 8 wherein said boot is made from a thermoplastic elastomer.

10. The boot of claim 2 wherein said annular roots of said first plurality of convolutes have a cross-sectional thickness greater than a cross-sectional thickness of said annular peaks of said first plurality of convolutes.

11. The boot of claim 10 wherein said cross-sectional thickness of said annular roots of said first plurality of convolutes is 1.5 times the cross-sectional thickness of said annular peaks of said first plurality of convolutes.

12. A boot for sealing the open end of a constant velocity universal joint, said constant velocity universal joint having an outer joint member, an inner joint member, and a shaft connected to said inner joint member, said boot comprising:
   a large diameter end portion adapted for attaching to said outer joint member;
   a small diameter end portion adapted for attaching to said shaft;
   an articulation accommodating portion adjacent to said large diameter end portion for accommodating the angular displacement of said inner joint member relative to said outer joint member;
   a linear displacement accommodating portion disposed between said articulation accommodating portion and said smaller diameter end portion which accommodates for the linear displacement of said inner joint member relative to said outer joint member, said linear displacement accommodating portion comprising at least two annular convolutes, each annular convolute of said at least two annular convolutes having an annular peak disposed between two annular roots, the diameter of said annular peaks being substantially equal to each other and the diameter of said annular roots being substantially equal to each other;

a boot stabilizer portion disposed between said articulation accommodating portion and said linear displacement accommodating portion for inhibiting an eccentric rotation of said boot at high rotational speeds, said stabilizer portion having a diameter smaller than the diameter of said linear displacement portion and slightly larger than said shaft diameter.

13. The boot of claim 12 wherein said articulation accommodating portion comprises a plurality of convolutes, each convolute of said plurality of convolutes having an annular peak disposed between two annular roots, the diameter of said annular peaks and said annular roots closer to said large diameter end portion being larger than the diameters of said annular peaks and said annular roots located closer to said small diameter end portion.

14. The boot of claim 13 wherein each annular convolute of said plurality of annular convolutes of said articulation accommodating portion has at least one annular side portion connecting said annular peak to one of its adjacent annular roots and wherein each annular root has a cross-sectional thickness greater than a cross-sectional thickness of said at least one annular side portion.

15. The boot of claim 13 wherein predetermined annular convolutes of said plurality of annular convolutes of said articulation accommodating portion are disposed between a pair of adjacent annular roots, and wherein each annular convolute of said predetermined convolutes has a pair of annular side portions connecting said annular peaks to said adjacent annular roots, said annular roots having a cross-sectional thickness greater than a cross-sectional thickness of said annular side portions.

16. The boot of claim 15 wherein said cross-sectional thickness of said annular roots is approximately 1.5 times said cross-sectional thickness of said annular side portions.

17. The boot of claim 13 wherein said annular roots of said articulation accommodating portion have a first cross-sectional radius of curvature and wherein said annular roots of said linear displacement accommodating portion have a second cross-sectional radius curvature which is smaller than said first radius of curvature.

18. The boot of claim 12 wherein said stabilizer portion comprises a first annular root connected to the end of said articulation accommodating portion opposite said large diameter end and a second annular root connected at one end to said first annular root and connected at the opposite end to said linear accommodating portion; said first and second annular roots of said stabilizer portion having a diameter smaller than the diameter of said linear displacement portion and slightly larger than said shaft diameter.

19. The boot of claim 18 further comprising an external annular rib reinforcing said boot stabilizer portion.

20. The boot of claim 12 wherein each annular convolute of said at least two annular convolutes of said linear displacement accommodating portion has at least one annular side portion connecting said annular peak to one of its adjacent annular roots and wherein each annular root has a cross-sectional thickness greater than a cross-sectional thickness of said at least one annular side portion.

21. The boot of claim 20 wherein said cross-sectional thickness of said annular roots of said linear displacement accommodating portion is approximately 1.5 times said cross-sectional thickness of said annular side portions.

* * * * *